United States Patent

Schmitt

[15] 3,670,265

[45] June 13, 1972

[54] TUNING FORK STABILIZED TRANSISTOR DRIVE FOR TIME PIECES

[72] Inventor: Karl Schmitt, Achern, Germany

[73] Assignee: Gehap Gesellschaft fur Handel und Patentverwertung mbH. & Co. Kg, Germany

[22] Filed: July 14, 1970

[21] Appl. No.: 54,759

Related U.S. Application Data

[63] Continuation-in-part of Ser. No. 719,782, April 8, 1968, Pat. No. 3,579,974.

[52] U.S. Cl. ....331/116 M, 58/23, 58/23 TF, 310/25, 318/128, 331/156

[51] Int. Cl. ....G04c 3/00, H03b 5/30

[58] Field of Search ....331/116 M, 156; 58/23, 23 A, 58/23 AO, 23 TF; 310/25; 318/128

[56] References Cited

UNITED STATES PATENTS

| | | | |
|---|---|---|---|
| 3,010,075 | 11/1961 | Epperlein | 331/116 M |
| 3,243,951 | 4/1966 | Kawakami | 331/116 M X |
| 3,462,939 | 8/1969 | Tanaka et al | 58/23 TF |

*Primary Examiner*—Roy Lake
*Assistant Examiner*—Siegfried Grimm
*Attorney*—Otto John Munz

[57] ABSTRACT

An electronically controlled movement mechanism for time pieces and the like having an electronic oscillatory circuit stabilized by means of a tuning fork resonator, the ends of the tuning fork legs carrying small permanent magnets which face the axial ends of the yoke of an oscillation and drive coil assembly over air gaps, thereby being directly excited by the extraneous magnetic field of the oscillation and drive coil assembly. The moving magnetic field of the oscillating permanent magnets is fed back into the oscillation and drive coil assembly to stabilize its oscillatory frequency. The circuit is further stabilized by a field-responsive resistor in parallel with the resistance of the oscillatory circuit and interacting with the oscillating permanent magnets.

7 Claims, 3 Drawing Figures

Inventor:
KARL SCHMITT
BY [signature]
ATTORNEY

Inventor:
KARL SCHMITT
BY [signature]
ATTORNEY

TUNING FORK STABILIZED TRANSISTOR DRIVE FOR TIME PIECES

CROSS-REFERENCE TO RELATED APPLICATION

This application is a continuation-in-part of my prior co-pending application 719,782, filed Apr. 8, 1968, claiming a priority date of Apr. 8, 1967, and now issued as U.S. Pat. No. 3,579,974.

BACKGROUND OF THE INVENTION

1. Field of the Invention

The invention relates to electronically controlled movement mechanisms, and in particular, to electronically controlled movement mechanisms for time pieces having an electronic oscillatory circuit stabilized by means of a tuning fork resonator.

2. Description of the Prior Art

The prior art in the above field includes a known electronically controlled movement mechanism which can be used as a drive for time pieces and consists of an electronic oscillatory circuit stabilized by means of a tuning fork, including one or several oscillation coils. In this known time piece movement, the oscillation coils of the oscillation circuit also serve as drive coils for a drive wheel whose motion is transmitted to the associated movement mechanism.

In order to obtain a good consistancy of oscillation, and thus a higher accuracy of motion, the above-mentioned known movement mechanism includes a tuning fork in the region of the oscillation coils. This tuning fork is excited by means of a special oscillation circuit. Transmission of the oscillation frequency of the tuning fork to the oscillation and drive coils themselves produces a stabilization of the frequency of the entire drive circuit and consequently a higher accuracy of the movement mechanism.

This tuning fork stabilization, even though in principle representing an economically most promising approach, was initially not developed any further because of difficulties encountered in connection with the excitation of the tuning fork resonator and because it was in each case necessary to have a special oscillation circuit for this excitation. As a result, the requirements of circuitry were increased and such movement mechanisms became more costly.

SUMMARY OF THE INVENTION

Underlying the present invention was the objective to achieve a simplification and consequently a reduction in cost of the above-mentioned electronically controlled movement mechanism for time pieces, while retaining the high movement accuracy obtainable through tuning fork synchronization. The invention is based upon the unexpected discovery that, given certain circumstances, no special oscillation circuit is necessary to excite the tuning fork resonator, if the latter is designed and arranged in a particular way.

In order to attain the above objective, the invention suggests an electronically controlled movement mechanism, and in particular, a movement mechanism for time pieces which has an electronic oscillatory circuit stabilized by means of a tuning fork and includes one or several oscillation coils which also serve as drive coils for a drive wheel and its associated movement mechanism, the coils being connected with the oscillatory circuit to produce the oscillation frequency and the tuning fork being located within the extraneous magnetic field of the oscillation coils, this movement mechanism being characterized in that the tuning fork for its synchronization is directly excited by the oscillation and drive coil assembly of the drive wheel and that, for this purpose, the tuning fork is permanently magnetized at least in part within the region of the extraneous field of the oscillation coil assembly.

According to a preferred embodiment of the invention, the end portions of the tuning fork which are located within the extraneous field of the oscillation and drive coil assembly are provided with small permanent magnets.

With the structure as suggested by the invention, the oscillating tuning fork is directly excited by the oscillation and drive coils themselves, thereby causing the tuning fork to execute an oscillation, which oscillation in turn affects the oscillation and drive coils by moving the magnetic field of the permanent magnets, thereby synchronizing the frequency of the electronic oscillatory circuit to correspond with the natural frequency of the tuning fork. Thus, the oscillation and drive coils of this arrangement also serve as the excitation coils for the tuning fork, which latter, as a result of its permanent magnet arrangement or other permanently magnetic structure, stabilizes the frequency of the oscillation and drive coils.

It should be understood to be obvious that for the tuning fork there may be substituted various other mechanical resonators and balance wheel governors which would have, within the extraneous field of the oscillation and drive coil assembly, a permanent magnet arrangement, or which would have a permanently magnetized structure in this region so as to stabilize the oscillation and drive circuit frequency by oscillating in its natural frequency.

BRIEF DESCRIPTION OF THE DRAWINGS

In the accompanying drawings are illustrated, by way of examples, several preferred embodiments of the invention, represented in the various figures as follows.

DESCRIPTION OF THE PREFERRED EMBODIMENTS

Figure 1:
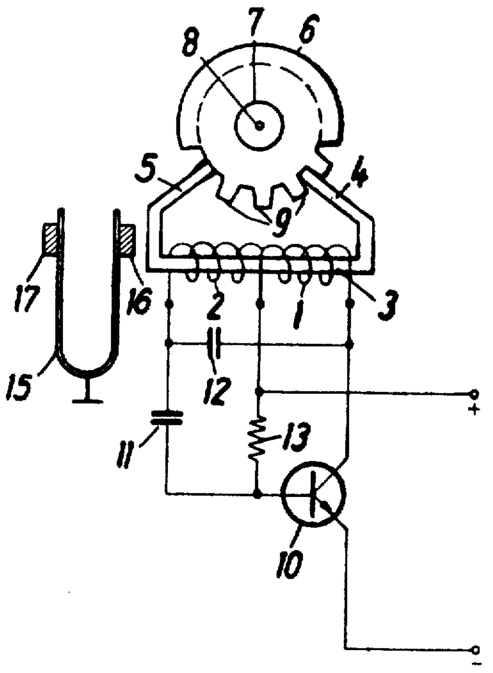
FIG. 1 shows the oscillation and drive portion of a tuning-fork-stabilized, electronically controlled, movement mechanism embodying the invention.

As can be seen from FIG. 1, the electronically controlled movement mechanism of the invention consist primarily of two oscillation and drive coils 1 and 2 surrounding a common magnet yoke 3 which has two pole pieces 4 and 5. The drive wheel 6 consists of a thin metal disc which is arranged between two axially magnetized permanent magnets 7 and rotatably mounted on the drive wheel shaft 8. The drive wheel 6 has on its periphery a plurality of tongues 9 which are magnetized by the permanent magnets 7. The drive wheel 6 is so arranged with respect to the pole pieces 4 and 5 that its tongues 9 pass between them.

The oscillation and drive coils 1 and 2 for the drive wheel are part of an electronic oscillatory circuit which further includes a transistor 10, two capacitors 11 and 12, and a resistor 13.

In the region of the extraneous magnetic field around the yoke 3 is arranged a tuning fork 15 which carries two small permanent magnets 16 and 17 on its two legs. Of the two permanent magnets 16 and 17, in principle only the magnet 16 would be necessary for synchronization, but for reasons of weight stabilization, an exactly identical permanent magnet 17 is attached to the other leg of the tuning fork.

It is of course possible to add further weights and other adjustment means to the legs of the tuning fork, in order to change its natural frequency so as to adjust the speed of the movement mechanism. The tuning fork may also have any of a number of different forms or be arranged in combination with a variety of different yoke structures for the coils 1 and 2.

It is further possible to substitute for the tuning fork 15 other mechanical resonators and balance wheels in combination with a permanent magnet arrangement. The yoke structure of the oscillation and drive coil assembly can also be modified. In each case, it is important, however, that the oscillations of the tuning fork resonator are transformed into changes in the magnetic field resulting from the motion of the permanent magnets, whereby the changes in field strength control the oscillation and drive coils 1 and 2 so as to stabilize the entire oscillatory drive circuit.

Figure 2:
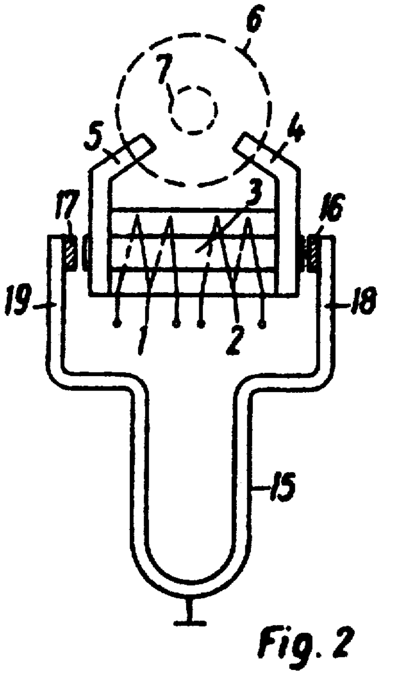
FIG. 2 is similar to FIG. 1, but with a modified tuning fork resonator, representing a second embodiment of the invention.

In FIG. 2 is shown a second embodiment of the invention, also using a tuning fork with permanent magnets attached to its legs. The tuning fork 15 includes outwardly offset leg portions 18 and 19 in its upper region, the leg ends thus being spaced far enough apart that the entire oscillation and drive coil assembly, consisting of the two oscillation and drive coils 1 and 2 and the magnetic yoke 3, can be positioned between them. The small permanent magnets 16 and 17 are arranged at the inside of the two leg portions 18 and 19, facing the magnetic yoke 3 on each side over an air gap.

The arrangement of FIG. 2 provides for an improved and quicker oscillation startup in the tuning fork, as both magnets 16 and 17 are under the influence of the alternating field around the yoke 3. It eliminates the shortcoming of the arrangement of FIG. 1, where the leg with the magnet 17 tends to dampen the system. The arrangement of the polarities of the two small magnets 16 and 17 is such that a proper synchronous oscillation is induced in the tuning fork 15 by the rythm of the alternating field of the coils 1 and 2, this tuning fork oscillation in turn assuring a consistant frequency of the oscillatory circuit as a result of the magneto-inductive feedback of the permanent magnets 16 and 17.

Figure 3:
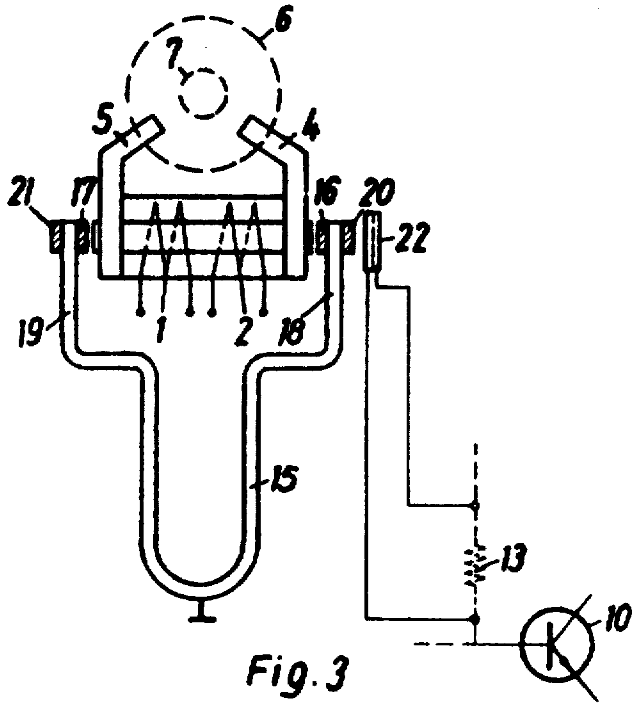
FIG. 3 shows an arrangement similar to that of FIG. 2, but further modified, to represent a third embodiment of the invention.

In FIG. 3 as illustrated a third embodiment of the invention, derived from that shown in FIG. 2. In the example given, an additional small permanent magnet 20 is attached to the outside of the leg portion 18, while a piece 21 of equal weight is attached to the outside of the leg portion 19, in order to retain the weight balance. Facing the permanent magnet 20 over a small air gap is a field-responsive resistor 22. This field-responsive resistor is part of the transistorized oscillatory circuit shown in FIG. 1 and is connected in parallel with the basic resistor 13. The modification suggested in FIG. 3 further stabilizes the frequency of the oscillatory circuit, as the oscillations of the tuning fork 15 induce corresponding changes in the resistance of the field-responsive resistor 22, thereby causing corresponding changes in the base potential of the transistor 10 so as to control the frequency of the entire oscillatory arrangement. The result of such an arrangement is a further stabilization of the oscillatory circuit.

Finally, it should be understood that the movement mechanism of the invention is not limited in its application to movements for time pieces such as wrist watches and the like. Rather, it may also be used in combination with other devices such as, for example, for monitoring the constant drive speed of motorized drive mechanisms, for devices measuring or comparing the speed of rotation, and for related applications requiring a high-accuracy control device.

I claim:

1. An electronically controlled movement mechanism for timing devices comprising, in combination:

A. a mechanical drive train including a magnetically drivable drive wheel,

B. a free-running inductance-capacitance electronic oscillation circuit capable of operation without outside mechanical resonators comprising:

B1. at least one oscillation coil for providing said inductance for inducing oscillation in said oscillation circuit and for generating an oscillating magnetic field, and B2. a yoke means for directing the magnetic field past said drive wheel to drive the wheel, C. a permanent magnet means, D. a mechanical resonator means in the form of a tuning fork with two oscillating legs for moving said permanent magnet means at a predetermined natural frequency within a portion of said magnetic field extraneous to the yoke means, whereby the mechanical resonator means is excited to oscillation by said extraneous portion of said magnetic field, and whereby the permanent magnet means provides stable frequency feedback to said oscillation coil to stabilize the frequency of said oscillation circuit.

2. A movement mechanism as defined in claim 1, the two oscillating legs of the tuning fork carrying attachments of identical mass, connected thereto by bonding, one of the attachments being said permanent magnet means.

3. A movement mechanism as defined in claim 1, the two oscillating legs of the tuning fork being located within axially opposite extraneous portions of said magnetic field of the oscillation coil, said permanent magnet means comprising two permanent magnets, each leg having one of said two permanent magnets attached thereto for interaction with the extraneous portion of the magnetic field surrounding it.

4. A movement mechanism as defined in claim 3, the oscillation coil having a central longitudinal axis, the yoke means being positioned in this axis and protruding at both axial ends of the coil with oppositely oriented yoke faces;

the distance between the oscillating legs of the tuning fork being greater than the axial length of the yoke means, and the permanent magnets being respectively attached to the legs of the tuning fork facing the yoke faces across air gaps.

5. A movement mechanism as defined in claim 4, the tuning fork including:

a base for its attachment to a stationary mass;

a narrow leg portion adjacent to the base and including the main bending region of the fork;

a widened leg portion extending outwardly from the narrow leg portion and connected thereto by symmetrical offsets in the legs;

the permanent magnets being attached to the inside of the legs in the widened leg portion and in the vicinity of the free ends thereof.

6. A movement mechanism as defined in claim 4, the electronic oscillation circuit further including a field-responsive resistor located within the moving magnetic field of the permanent magnets attached to the legs of the tuning fork and connected to further control the frequency of said oscillation circuit.

7. A movement mechanism as defined in claim 6, the tuning fork including, on at least one of its legs, a second permanent magnet attached to the outside of the leg, the field-responsive resistor facing this second permanent magnet across an air gap.

* * * * *